United States Patent Office 3,570,221
Patented Mar. 16, 1971

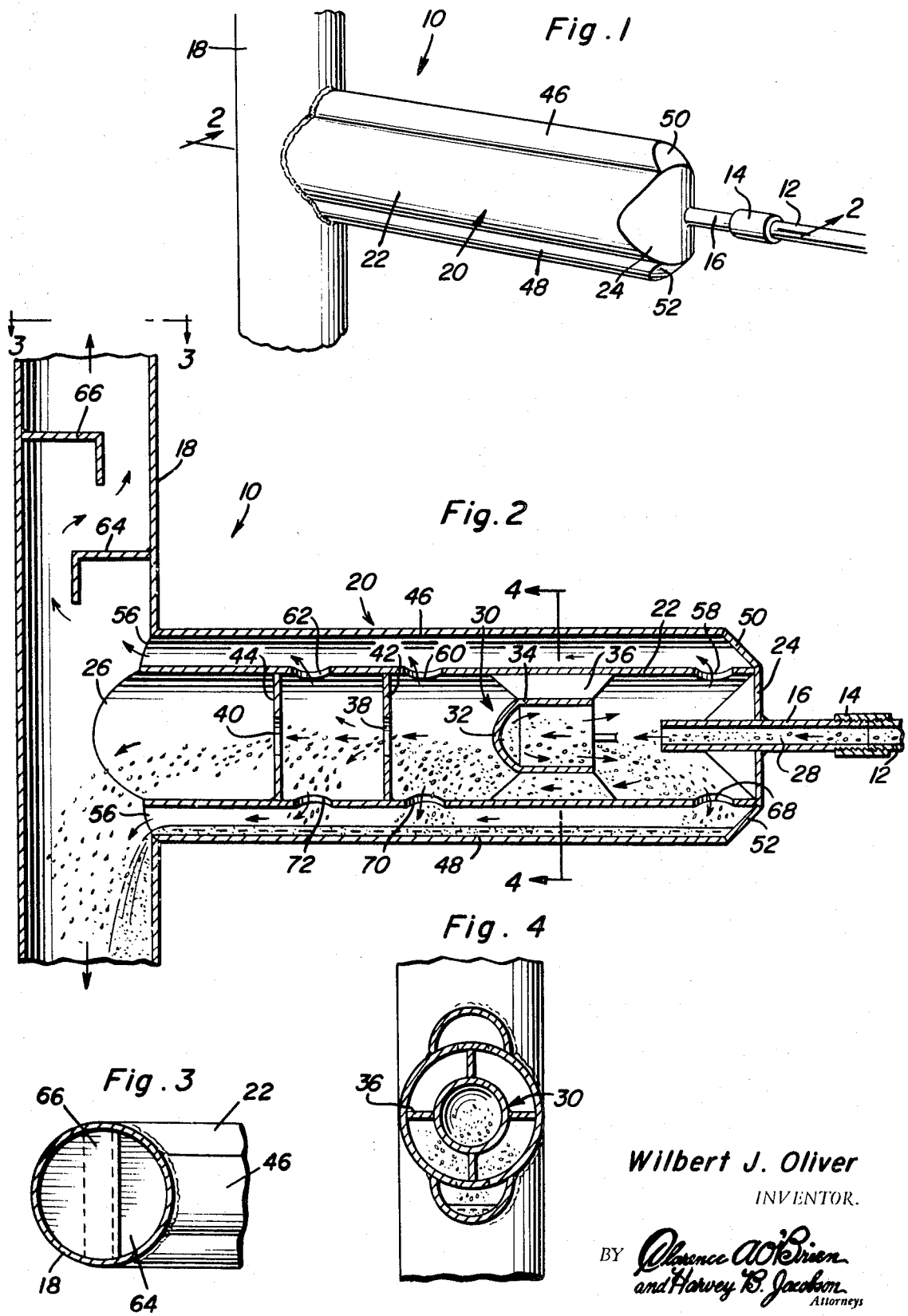

3,570,221
TWO PHASE FLUID-SOLID SEPARATOR
Wilbert J. Oliver, P.O. Box 163, Egan, La. 70531
Filed Feb. 20, 1969, Ser. No. 801,099
Int. Cl. B01d *51/00*
U.S. Cl. 55—418
11 Claims

ABSTRACT OF THE DISCLOSURE

A mechanical separator for removing liquid and solid particles from a gaseous mixture discharged under pressure from a well during a cleaning operation. Axial flow of the mixture through a horizontal chamber is progressively baffled to separate gas from liquid and solid particles. The gas is collected within an upper channel and conducted to a vertical outlet pipe while the liquid and solids are collected in a lower channel for gravity discharge from the outlet pipe.

---

This invention relates to the extraction of liquid and solid particles from gaseous mixtures by means of a gas-fluid separator.

During well cleaning operations, a gaseous mixture containing hydrocarbon gases and liquids, water and sand, are discharged into the atmosphere. This discharge causes pollution of the air by a spray of surface eroding solid particles and liquids with the gas. It is therefore a primary object of the present invention to avoid property damage resulting from such uncontrolled discharges to atmosphere.

In accordance with the present invention, the gaseous mixture aforementioned, is conducted through a gas-fluid separator so that the gas entrained within the liquid and solid particles may be extracted and released to atmosphere alone, with the solid particles and liquid being dumped into a pit or collected for storage. Separation of the gas is accomplished by initially baffling the gaseous mixture with a concave baffle member concentrically positioned in spaced relation to the discharge end of the discharge conduit within a horizontal chamber. A portion of the gas is thereby separated and conducted into an upper channel while a portion of the liquid and solid components of the mixture are conducted into a lower channel from which the separated portions of the mixture are conducted toward a vertical outlet pipe. The remainder of the mixture flows toward the outlet pipe and is progressively baffled by apertured baffle plates vertically positioned in axially spaced relation to each other causing the remainder of the gas to separate and flow into the upper channel while the liquid and solids are conducted into the lower channel. At the outlet pipe, the gas from the upper channel is conducted upwardly through a baffle zone to be discharged to atmosphere while the liquid and solids drop downwardly throught the outlet pipe.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a perspective view showing the separator of the present invention.

FIG. 2 is an enlarged sectional view taken substantially through a plane indicated by section line 2—2 in FIG. 1.

FIG. 3 is a partial sectional view taken substantially through a plane indicated by section line 3—3 in FIG. 2.

FIG. 4 is a transverse sectional view taken substantially through a plane indicated by section line 4—4 in FIG. 2.

Referring now to the drawings in detail, FIG. 1 illustrates the separator generally referred to by reference numeral 10 as connected to the discharge end of a discharge conduit 12 from which a gaseous mixture containing hydrocarbon gas, liquid, water and sand is normally discharged to atmosphere. The discharge conduit 12 is therefore connected by the coupling 14 to the inlet conduit 16 of the separator resulting in the upward outflow of gas alone from a vertical outlet conduit 18, while the liquid and solid particles are dropped downwardly through this outlet conduit below a horizontal chamber portion 20 interconnecting the vertical outlet conduit 18 with the inlet conduit 16.

Referring now to FIG. 2 in particular, it will be observed that the inlet conduit 16 extends axially into the chamber portion 20 formed by an elongated, tubular housing 22 which may be cylindrical in cross-section. The inlet end of the housing 22 is closed by an end wall 24 through which the inlet conduit 16 extends and to which it is welded. The opposite axial end of the housing 22 opens at 26 into the vertical outlet pipe 18 to which the housing is welded. It will be apparent therefore, that the gaseous mixture generally referred to by reference numeral 28 flows horizontally from the inlet conduit 16 through the tubular housing 22 toward its outlet end 26, the tubular housing being substantially larger in cross-sectional diameter than the inlet conduit.

A baffle member 30 is fixedly mounted within the horizontal tubular housing 22 and includes a rear concave portion 32 at one axial end of a cylindrical portion 34 into which the gaseous mixture enters and exits in a reverse flow direction after impinging on the concave baffle portion 32. The baffle member 30 is fixedly mounted coaxially within the housing 22 and in axial alignment with the inlet conduit 16 by means of a plurality of equally spaced fins 36, as shown in FIGS. 2 and 4. Thus, flow of the gaseous mixture through the radial space between the baffle member 30 and the wall of the tubular housing 22, will be axial, the fins 36 preventing any vortical flow.

The axially directed flow of the gaseous mixture that passes the initial baffle member 30, impinges upon and is partially conducted through centrally aligned openings 38 and 40 formed in axially spaced, vertical baffle plates 42 and 44 internally welded to the wall of the tubular housing 22. The vertical baffle plates 42 and 44 are disposed in axially spaced relation between the baffle member 30 and the outlet end 26 of the tubular housing in order to progressively baffle horizontal flow through the tubular housing.

An upper channel member 46 in the form of a semi-cylindrical pipe is welded to the upper portion of the tubular housing 22 while a lower channel 48 in the form of a semi-cylindrical pipe is welded to the bottom portion of the tubular housing spaced 180 degrees from the upper channel. The upper and lower channel members are smaller in diameter than the housing and are closed adjacent the inlet end of the housing by end walls 50 and 52. The opposite axial ends 54 and 56 of the channel members open into the vertical outlet conduit 18 above and below the tubular housing. Separated phases of the gaseous mixture are accordingly conducted axially through the channel members for discharge into the vertical outlet conduit.

Passage openings 58, 60 and 62 are formed in the tubular housing 22 between the baffle member 30 and the inlet end wall 24, between the baffle member and the baffle plate 42 and between the two baffle plates as shown in FIG. 2 in order to conduct separated gas upwardly from the horizontal housing 22 into the upper channel member 46. The gas so collected within the upper channel member will be conducted into the vertical outlet conduit having baffles 64 and 66 mounted therein above the upper channel member in order to finally baffle the separated gas being conducted upwardly for discharge to atmosphere. Thus, the gas that leaves the separator will be completely free of liquid and solid particles.

The horizontal tubular housing 22 is also provided with passage openings 68, 70 and 72 between its inlet end and the baffle member 30, between the baffle member 30 and baffle plate 42 and between the baffle plates 42 and 44. Liquid and solid particles are conducted through the passage openings 68 and 70 into the lower channel member 48 which also collects liquid particles conducted through the opening passage 72, the liquid and solid particles being discharged from the lower channel into the vertical outlet conduit. It will therefore be apparent that the separated liquid and solid particles collected within the lower channel as well as liquid particles from the outlet end 26 of the housing 22 will be discharged downwardly through the vertical outlet conduit 18 after all of the gas has been separated therefrom.

Because of the concentric mounting of the baffle member 30 within a horizontal tubular chamber and the concavity of its rear end portion 32, turbulence is created when the gaseous mixture entering the horizontal chamber impinges therein. The baffle member 30 will accordingly redirect a portion of the gaseous mixture and because of the turbulence created thereby will partially separate some of the gas therefrom which enters the upper channel through passage opening 58. The remainder of the gaseous mixture flows axially past the initial baffle member 30 between the fins 36 which prevent any vortical flow and the deleterious effects of centrifugal action. The mixture is then progressively baffled by the vertical baffle plates 42 and 44 causing transverse gravitational separation of the gas from the liquid and solid particles. The separated phases of the mixture are collected within the upper and lower channel members so that gas free of liquid and solids may be upwardly discharged from the vertical outlet plate while the remainder of the mixture is conducted downwardly.

The foregoing is considered as illustrative only of the principles of the invention. Further, since numerous modifications and chnages will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. Apparatus for separating gas from liquid and solid phases of a mixture being discharged under pressure from a conduit, comprising a horizontally elongated tubular housing having a closed inlet end through which said conduit extends and an open outlet end, upper and lower collection channels mounted on said tubular housing having closed ends adjacent the inlet end of the housing and open ends adjacent the outlet end of the housing, a concave baffle member mounted within the housing in radially spaced relation thereto horizontally spaced from said conduit, at least two vertical baffle members mounted within the housing between said concave baffle member and the outlet end restricting horizontal flow through the housing toward the outlet end, said housing being provided with horizontally spaced passages between the baffle members and said closed inlet end conducting the gas to the upper collection channel and the liquid and solid phases to the lower collection channel, and a vertical outlet member connected to the housing and the channels into which the separated gas, liquid and solid phases are discharged from the said open ends of the housing and the channels.

2. The combination of claim 1 including vertically spaced baffles mounted internally of the vertical outlet member above the open end of the upper channel.

3. The combination of claim 2 wherein the tubular housing is cross-sectionally larger in flow area than the collection channels and the conduit.

4. The combination of claim 3 wherein the concave baffle member is concentrically mounted in axial alignment with the conduit by axial flow directing fins.

5. The combination of claim 4 wherein said vertical baffle members comprise baffle plates having aligned passage openings therein.

6. The combination of claim 1 wherein the tubular housing is cross-sectionally larger in flow area than the collection channels and the conduit.

7. The combination of claim 6 wherein the concave baffle member is concentrically mounted in axial alignment with the conduit by axial flow directing fins.

8. The combination of claim 7 wherein said vertical baffle members comprise baffle plates having aligned passage openings therein.

9. The combination of claim 1 wherein the concave baffle member is concentrically mounted in axial alignment with the conduit by axial flow directing fins.

10. The combination of claim 9 wherein said vertical baffle members comprise baffle plates having aligned passage openings therein.

11. The combination of claim 1 wherein said vertical baffle members comprise baffle plates having aligned passage openings therein.

References Cited

UNITED STATES PATENTS

| 965,604 | 7/1910 | Snively | 55—446X |
|---|---|---|---|
| 1,532,730 | 4/1925 | Chalupa et al. | 55—418 |
| 2,540,695 | 2/1951 | Smith et al. | 55—410X |

TIM R. MILES, Primary Examiner

S. H. MARKOWITZ, Assistant Examiner

U.S. Cl. X.R.

55—462, 464, 446